United States Patent [19]

Lalonde

[11] Patent Number: 5,315,772
[45] Date of Patent: May 31, 1994

[54] FARM TRACTOR WITH BACKHOE BUCKET

[76] Inventor: Nelson Lalonde, S.S. #3, Site 10, Comp. 11, Penetanguishene, Ontario, Canada, L0K 1P0

[21] Appl. No.: 991,004

[22] Filed: Dec. 16, 1992

[51] Int. Cl.$^5$ .............................................. E02F 5/02
[52] U.S. Cl. ........................................ 37/379; 37/403; 37/408; 37/903
[58] Field of Search ................. 37/103, 117.5, DIG. 3, 37/DIG. 12, 379, 403, 468, 407, 408, 903, 444; 414/723, 724, 912

[56] References Cited

U.S. PATENT DOCUMENTS

| | | | |
|---|---|---|---|
| 2,863,233 | 12/1956 | Johnson | 37/117.5 |
| 3,039,210 | 6/1962 | Slaughter | 37/117.5 |
| 3,542,435 | 11/1970 | Herrmann | 414/724 X |
| 3,665,622 | 5/1972 | Lamb | 37/117.5 |
| 3,795,331 | 3/1974 | Guest | 414/724 X |
| 3,866,342 | 2/1975 | Cooper | 37/DIG. 3 X |
| 4,172,687 | 10/1979 | Schultz | 37/117.5 X |
| 5,027,906 | 7/1991 | Jeannotte et al. | 37/DIG. 12 X |
| 5,142,799 | 9/1992 | Wood | 37/117.5 |

Primary Examiner—Randolph A. Reese
Assistant Examiner—J. Russell McBee
Attorney, Agent, or Firm—Shlesinger Arkwright & Garvey

[57] ABSTRACT

A small utility tractor having a front-end loader which is modified to include a backhoe digger mounted on the front-end loader is disclosed. The backhoe digger is readily attached to or detached from the front-end loader to provide a digging function at the front of the tractor. The backhoe bucket is coupled to the front-end loader using an attachment device which releasably attaches the backhoe bucket to the front-end loader so that the backhoe bucket is located below the bottom of the front-end loader and the bucket front opening faces in the opposite direction to which the front-end loader opening faces.

22 Claims, 6 Drawing Sheets

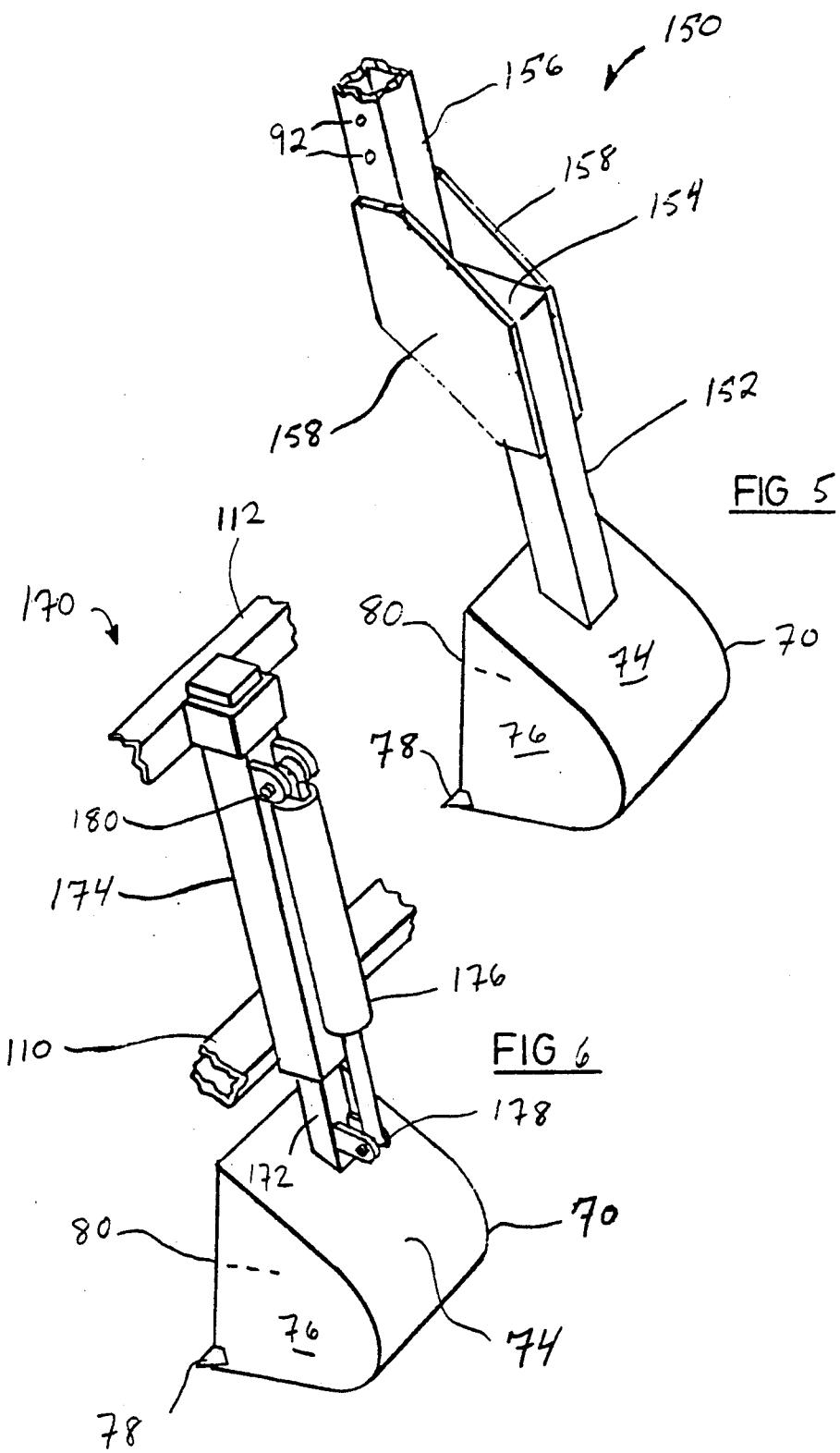

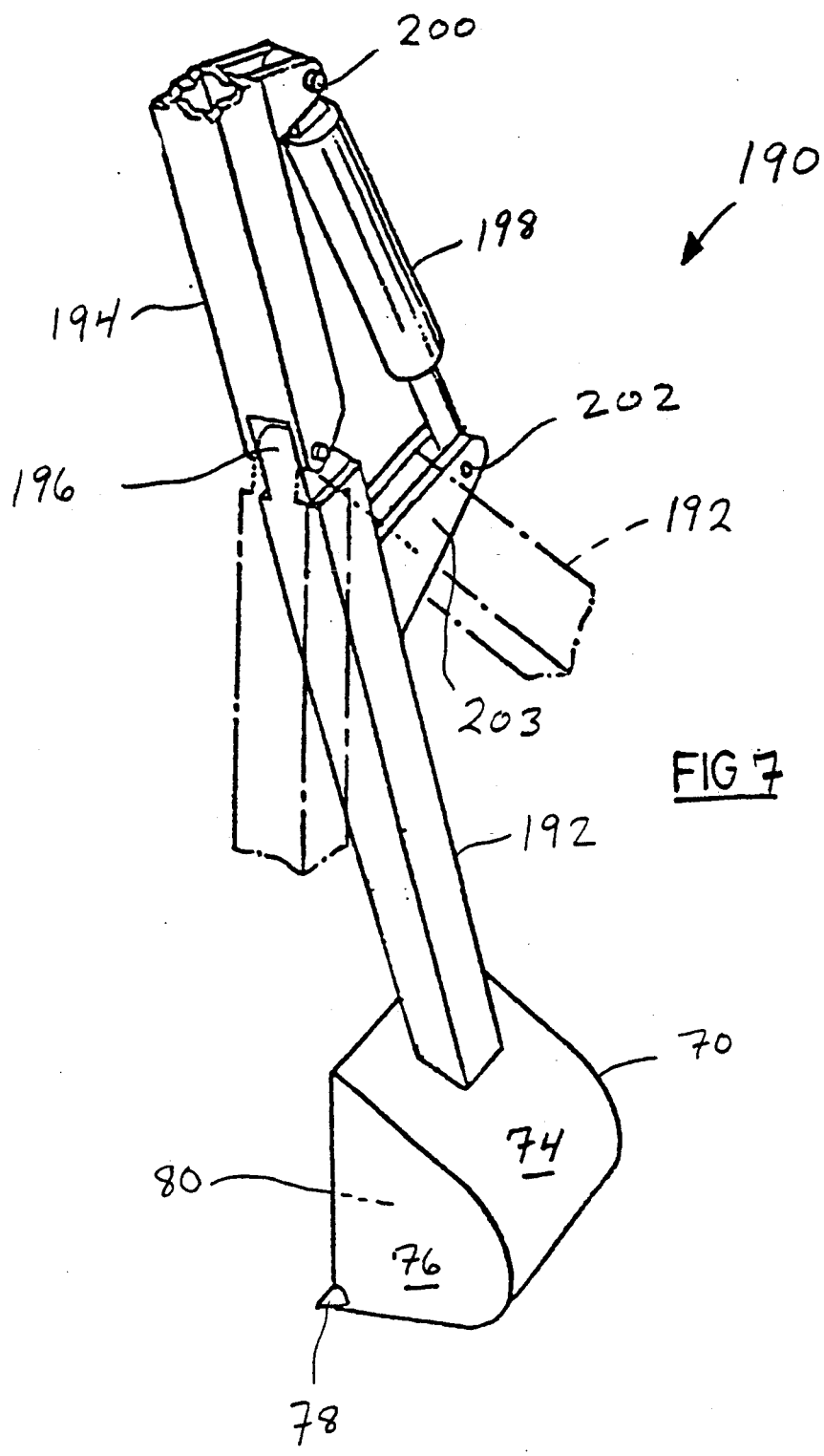

FARM TRACTOR WITH BACKHOE BUCKET

FIELD OF THE INVENTION

The present invention relates to a utility tractor with a front-end loader modified to include a backhoe bucket attached to the front-end loader.

BACKGROUND OF THE INVENTION

Small earth working machinery for use on farms, cottages and the like such as tractors having wide front-end buckets or loaders are well known. Various known types of tractors include a narrower backhoe bucket extending rearwardly away from the tractor which dig and scrape by being drawn toward the tractor. The backhoe bucket is useful in applications not readily accomplished using the wider front-end loaders such as digging narrow trenches and working around tree trunks and the like. In general, tractors provided with both a backhoe digger and a front-end loader are more expensive than tractors provided with front-end loader alone. Another drawback to this type of tractor is that an operator must adjust his or her seating 180 degrees in order to utilize the backhoe digger.

Tractors having a standard backhoe digger alone attached to the front end of the tractor are known but provide a device of reduced utility with the front-end loader being absent. A further disadvantage of this type of tractor is that the backhoe digger usually has a cutting edge having an orientation which is fixed with respect to the rest of the tractor so that when the tractor is on a slope, the backhoe digger enters the ground at an angle to the horizontal equal to the angle of the slope on which the tractor is sitting.

It is known that earth working vehicles may be modified to provide dual function attachments to the front end of the vehicle. U.S. Pat. Ser. No. 2,863,233 discloses a bulldozer comprising a standard wide front-end loader or bucket with the bulldozer modified to include a narrower front-end trench digger pivotally mounted to the side wall of the front-end lobe for digging narrower and deeper trenches than achievable with the standard front-end bucket. A drawback to this type of device is the trench digger is large and opens in the same directions as the front-end loader and therefore not suitable for certain applications such as working around tree trunks.

Accordingly, it would be advantageous to provide a backhoe bucket which can be readily attached to, and detached from, a front-end loader of a tractor so that the backhoe bucket may be utilized by an operator without having to rearrange his or her seating. Further, it would be advantageous to provide a means for adjusting the orientation of the backhoe digger with respect to the terrain to be worked.

SUMMARY OF THE INVENTION

According to an aspect of the present invention, there is provided a backhoe apparatus for securement to a front-end loader of a tractor, the front-end loader of the type being pivotable about an axis extending transversely across the front of the tractor and is capable of being raised and lowered with respect to the tractor, the front-end loader having a back wall and a forward-facing opening defined by at least a bottom wall with a peripheral bottom edge and a top wall with a peripheral top edge, the peripheral bottom edge and the peripheral top edge having a distance therebetween, the backhoe apparatus comprising: (i) a backhoe bucket with an opening for excavating and receiving materials; (ii) an elongate rigid support means having a length greater than the distance between the peripheral top edge and the peripheral bottom edge of the front-end loader, the support means having an end attached to the backhoe bucket; and (iii) means for releasably securing the support means to the front-end loader without modifying the front-end loader, with the support means bearing directly against the top and bottom peripheral edges of the front-end loader, and with the backhoe bucket opening facing rearwardly of the opening of the front-end loader and extending below the bottom wall of the front-end loader the securing means comprising a plurality of rigid rail members joined end to end and having two free ends, the rail members for extending about the top, back and bottom walls of the front-end loader, the first free end connectable to the support means near the top peripheral edge of the front-end loader and the second free end connectable to the support means near the bottom peripheral edge of the front-end loader, for securing the support means to the front-end loader.

According to another aspect of the present invention, there is provided a tractor having a front-end loader of the type being pivotable about an axis extending transversely across the front of the tractor and is capable of being raised and lowered with respect to the tractor, the front-end loader having a back wall and a forward-facing opening defined by at least a bottom wall with a peripheral bottom edge and a top wall with a peripheral top edge, the peripheral bottom edge and the peripheral top edge having a distance therebetween, the tractor further comprising a backhoe apparatus secured to the front-end loader, the backhoe apparatus comprising: (i) a backhoe bucket with an opening for excavating and receiving materials; (ii) an elongate rigid support means having a length greater than the distance between the peripheral top edge and the peripheral bottom edge of the front-end loader, the support means having an end attached to the backhoe bucket; and (iii) means for releasably securing the support means to the front-end loader without modifying the front-end loader, with the support means bearing directly against the top and bottom peripheral edges of the front-end loader, and with the backhoe bucket opening facing rearwardly of the opening of the front-end loader and extending below the bottom wall of the front-end loader the securing means comprising a plurality of rigid rail members joined end to end and having two free ends, the rail members extending about the top, back and bottom walls of the front-end loader, the first free end connected to the support means near the top peripheral edge of the front-end loader and the second free end connected to the support means near the bottom peripheral edge of the front-end loader, to secure the support means to the front-end loader.

In another aspect of the invention there is provided a utility tractor comprising a chassis to which there is attached a front-end loader having a bottom and a front opening. The front end loader is operably coupled to the chassis so that it is located at the front of the tractor and the front opening faces away from the chassis. The front-end loader may be pivotally moved about an axis extending transversely across the front of said chassis. The front-end loader is operable to be raised and lowered with respect to the chassis. The tractor includes a backhoe bucket comprising a back wall and spaced side walls attached thereto defining an opening for receiving therein material to be excavated. The backhoe bucket includes a cutting edge located below the front opening for engaging the material to be excavated. The tractor includes securing means for releasably attaching the backhoe bucket to the front-end loader so that when the backhoe bucket is attached to the front-end loader the backhoe bucket is spaced from bottom of the front-end loader and the backhoe bucket opening faces in the opposite direction to which the front-end loader faces.

In another aspect of the invention, there is provided, for use with the standard front-end loader of a tractor having a front opening, a backhoe bucket comprising spaced side walls, a back wall extending between the side walls and a cutting edge at an end of the back wall. The backhoe bucket includes an opening for receiving therein material to be excavated. There is included securing means for releasably attaching the backhoe bucket to the front-end loader so that when the backhoe bucket is attached to the front-end loader the backhoe bucket is located below the bottom of the front-end loader and the backhoe bucket front opening faces in the opposite direction to which the front opening of the front-end loader faces.

BRIEF DESCRIPTION OF THE DRAWINGS

The tractor modified with a backhoe bucket attached to a front-end loader forming the subject invention will now be described, by way of example only, with reference to the accompanying drawings, in which:

FIG. 3b is a view along arrow B of FIG. 3a;

FIG. 5 is a perspective view, broken away, of another embodiment of a backhoe bucket which may be releasably attached to a front-end loader of a tractor in accordance with the present invention;

FIG. 6 is a perspective view, broken away, of another alternate embodiment of a backhoe bucket and associated attachment device for attaching the backhoe bucket to a front-end loader;

FIG. 7 is a perspective view, broken away, of another embodiment of backhoe bucket which may be attached to a tractor front-end loader and which can be pivoted side-to-side with respect to the vertical.

DETAILED DESCRIPTION OF THE INVENTION

Figure 1:
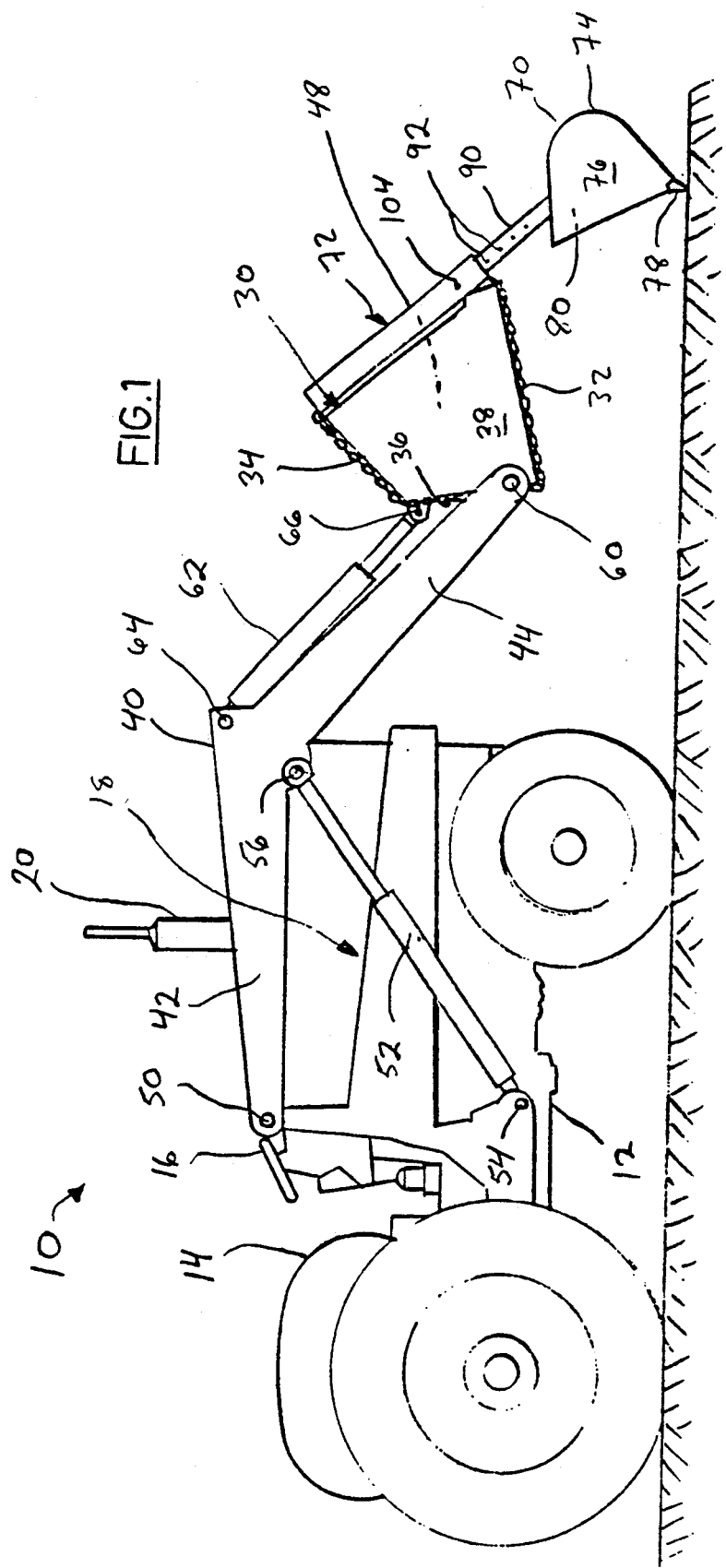
FIG. 1 is a side elevational view of a tractor comprising a front-end loader and having a backhoe bucket attached to the front-end loader in accordance with the present invention.
Figure 2:
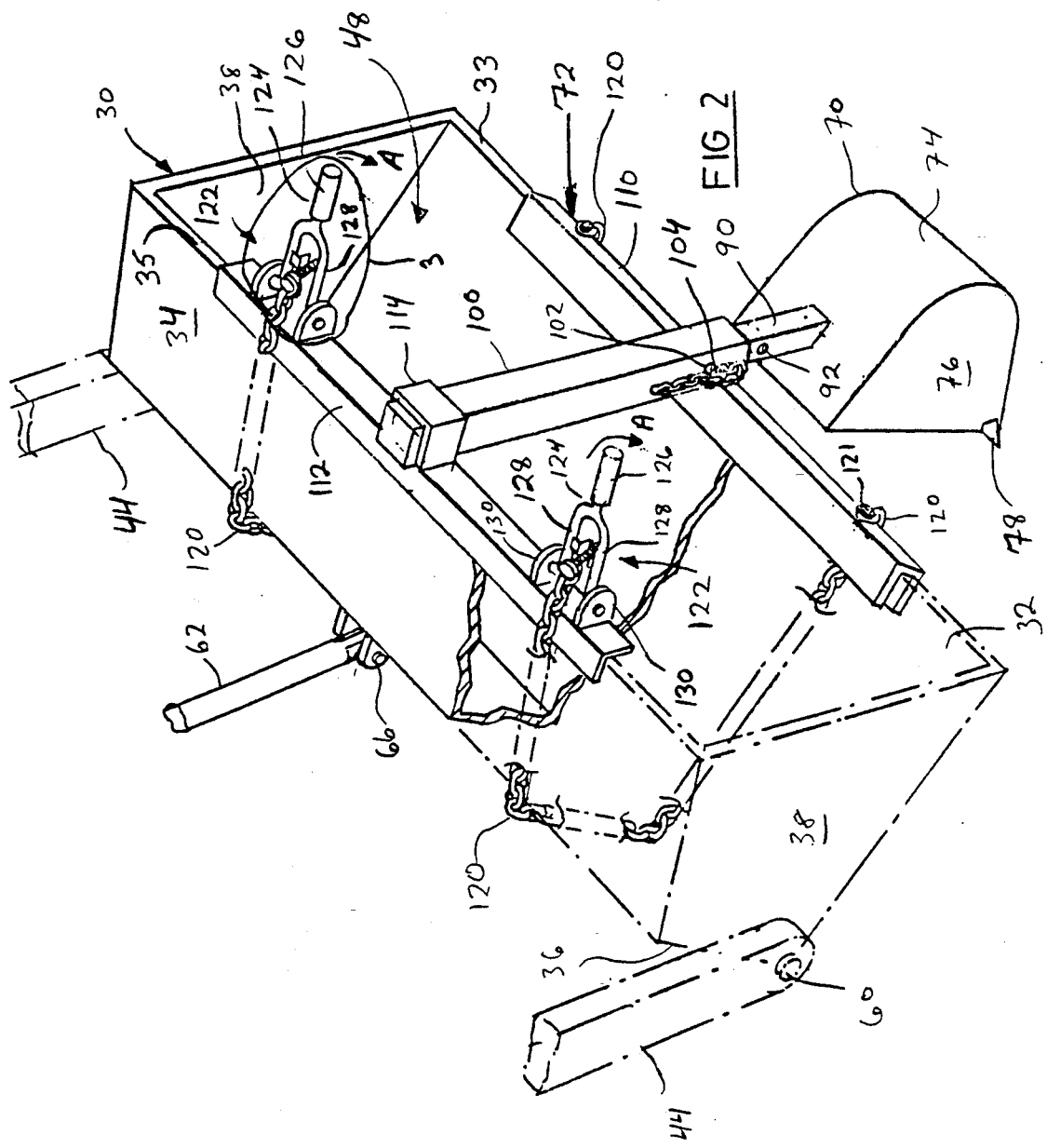
FIG. 2 is a perspective view, broken away, of an embodiment of a backhoe bucket secured to a standard front-end loader using one embodiment of a securing means to attach the bucket thereto.

In the ensuing description of the structure and operation of a tractor modified with a backhoe digger attached to the front-end loader forming the subject invention, reference will be made to the Figures wherein like numerals refer to like parts. Referring first to FIGS. 1 and 2, a small, wheeled utility tractor 10 includes a chassis 12, an operator's seating location 14 located behind a steering wheel 16 which is mounted behind a tractor power supply or engine located generally at 18 below engine exhaust stack 20. Tractor 10 includes a standard, wide front-end loader 30 attached to and extending outwardly away the front of chassis 12.

Front-end loader 30 comprises a bottom wall 32 having a peripheral edge 33, an upper wall 34 having a peripheral edge 35, a back wall 36 extending between bottom 32 and upper wall 34 and a pair of spaced side walls 38 attached to the back, upper and bottom walls, best seen in FIG. 2. Loader 30 includes a front opening 48 and the loader is pivotally attached to chassis 12 by a pair of attachment arms 40 (only one shown in FIG. 1) each comprising two longitudinal arm segments 42 and 44 at an angle to each other with each attachment arm 40 being of unitary construction. The free end of arm segment 42 is pivotally attached to chassis 12 at 50 in such a way that arms 40 can pivot up and down with respect to chassis 12. This up and down pivotal movement of arms 40 is achieved using a pair of spaced hydraulic cylinders 52 which are pivotally attached at one end thereof to chassis 12 at 54 and at the other end thereof to arms 40 at 56.

Front-end loader 20 is pivotally attached to arm segments 44 at 60 so that up and down movement of arms 40 provides up and down movement of loader 30. Pivotal movement of loader 30 with respect to arms 40 is achieved by a hydraulic or pneumatic cylinder 62 pivotally attached at one end thereof to arms 40 at 64 and at the other end thereof to loader 30 at 66. Cylinders 52 and 62 are under the full control of an operator (not shown) sitting in operator station 14 when tractor 10 is in use thereby providing full operator control over the pivotal and vertical movement of loader 30.

It will be appreciated that while tractor 10 is shown with cylinders 62 positioned above arm segments 44, they could be readily mounted below segments 44 as in other models of utility tractors. Similarly, other types of tractors which may be utilized could have arm segments 42 and cylinders 52 pivotally attached to vertical uprights which are rigidly secured to chassis 12.

The modification of tractor 10 to include a backhoe bucket digger attached to loader 30 comprising the subject invention will now be described. Referring to FIGS. 1 and 2, there is shown a first embodiment of a backhoe bucket digger 70 and a securing means 72 for releasably attaching bucket 70 to loader 30. Backhoe bucket 70 is of standard construction and comprises a curved back wall 73 and spaced side walls 76 attached to the side edges of the back wall. A plurality of spaced cutting teeth 78 are spaced along the bottom edge of back wall 74 (only one tooth shown) for facilitating the breaking and digging of the terrain. Backhoe bucket 70 has a front opening 80 through which material being excavated is received into the bucket. A rigid arm 90 is securely attached to back wall 74 and includes a plurality of spaced holes 92 extending therethrough along the length thereof.

Referring specifically to FIG. 2, securing means 72 used for securing backhoe bucket 70 to loader 30 includes a hollow tube 100 of a suitable dimension to slidably receive therein rigid arm 90. Tube 100 is provided with a hole 102 extending through the side walls thereof which is dimensioned to receive therein a pin 104 which is loosely attached to tube 100. The distance between bottom 32 of loader 30 and backhoe bucket 70 is adjusted by matching a hole 92 in arm 90 with hole 102 and inserting pin 104 through holes 102 and 92. Tube 100 is rigidly attached to two spaced cross beam brackets 110 and 112 each extending laterally of the tube. Cross beam brackets 110 and 112 are shaped and dimensioned to fit over the peripheral edges 33 and 35 of bottom wall 32 and top wall 34 respectively of loader 30. Tube 100 is rigidly secured to bracket 110 by any one of several mechanical bonding methods such as bolting or welding. A bracket 114 is welded to bracket 112 and tube 100 is slidably movable through bracket 114. In this way, securing means 72 may be used with different sized front-end loaders having different spacings between peripheral edges 33 and 35.

Brackets 110 and 112 are secured to loader 30 by a pair of chain lengths 120 each attached at one end thereof to bracket 110 at 121 and at the other end thereof to a locking mechanism shown generally at 122 which is operably attached to bracket 112. Chain lengths 120 are each looped about front-end loader 30 and pulled tight by locking mechanism 122 to provide a means for readily attaching and detaching backhoe bucket 70 to the front-loader.

Figure 3A:
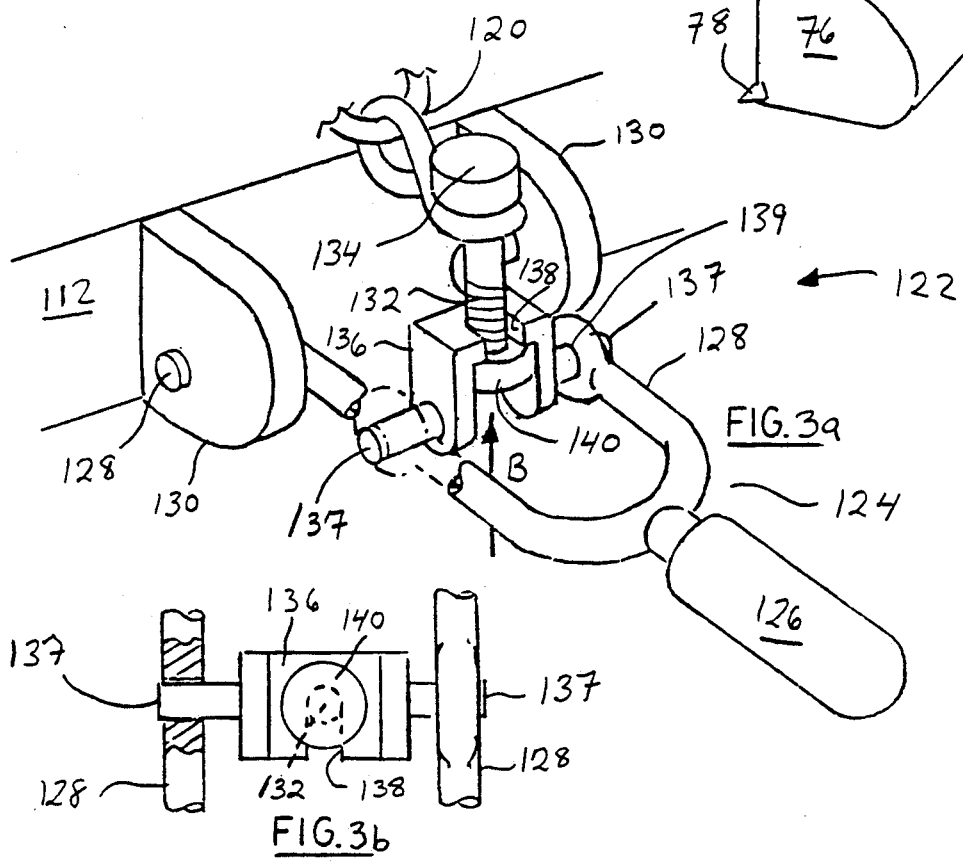
FIG. 3a is a more detailed view of the encircled portion 3 of FIG. 2.
Figure 3B:
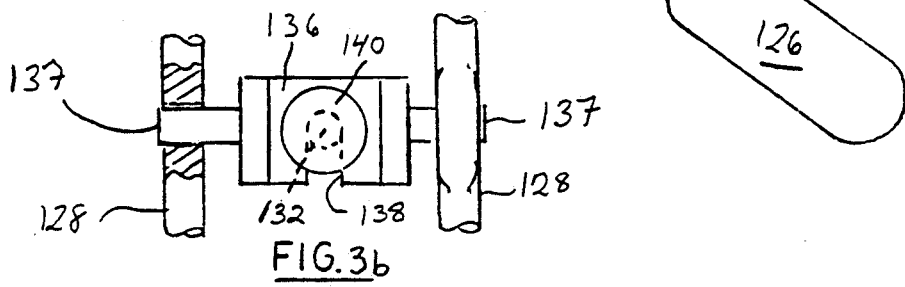

Locking mechanism 122 comprises a locking lever 124 in the shape of a tuning fork having a handle 126 and two spaced arms 128 attached at one end each of the handle. The ends of arms 128 spaced from handle 126 are pivotally attached to spaced mounting brackets 130. Referring to FIGS. 3a and 3b, locking lever 124 includes a bracket 136 provided with outwardly extending pins 137 which extend through loops 139 located in arms 128 thereby pivotally attaching bracket 136 to arms 128. Bracket 136 includes a cut-out portion 138. The end of each chain length 120 which is engaged by locking mechanism 122 comprises a threaded bolt 132 extending through a chain link of the chain length 120 wherein bolt head 134 is larger than the inner diameter of the chain link. A nut 140 is threadably received onto bolt 132 to keep the bolt locked to chain 120.

Figure 4:
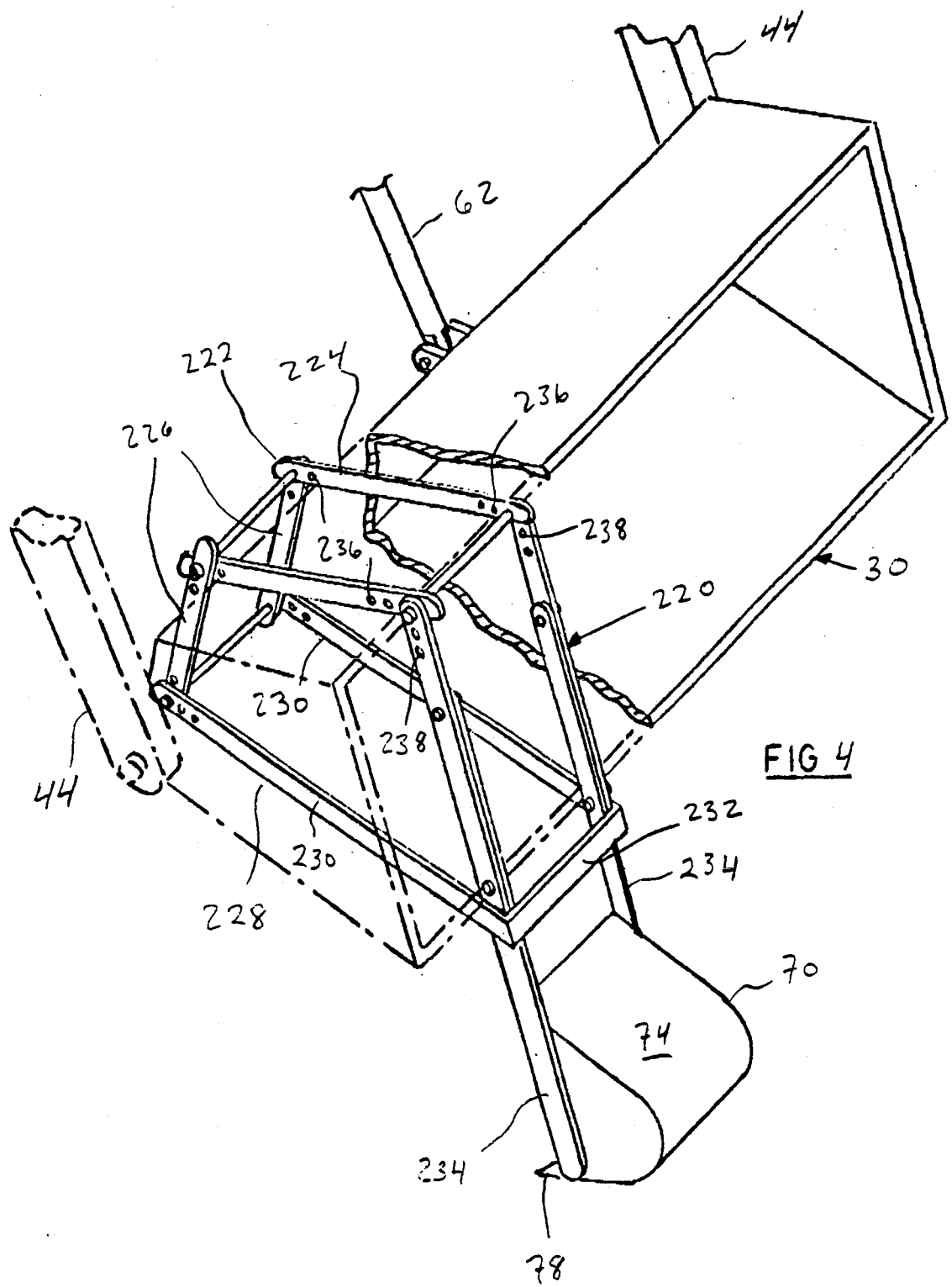
FIG. 4 is perspective view similar to FIG. 2, of another embodiment of a securing means used for attaching a backhoe bucket to a tractor front-end loader.

Referring to FIGS. 2 to 4, to lock securing device 72 in place about front-end loader 30, brackets 110 and 112 are mounted on edges 110 and 112 of the loader as shown and chain 120 looped about the loader, bolt 132 is passed between legs 128 of locking lever 124 and that portion of the bolt between nut 140 and the chain link is nested in cut-out portion 138. Lever 124 is then pivoted in the direction of arrow A (FIGS. 2 and 3a) thereby pulling chain 120 taut whereupon the lever locks in position.

It will be appreciated that locking device 122 is only one of many known locking devices which may be used to lock chain 120 in position. In addition, chain 120 could be readily replaced by a lengths of strong, flexible cable attached at the ends thereof to brackets 110 and 112 with a locking mechanism similar to device 122 for tightening the cable in position.

Referring to FIG. 4, another embodiment of a securing means used to attach backhoe bucket 70 to front-end loader 30 is shown generally at 220 and comprises a harness 222 having pairs of spaced, rigid, elongate connector members 224, 226 and a generally U-shaped bracket 228 comprising a pair of spaced arms 230 joined by a cross member 232 all connected together and extending about top wall 34, back wall 36 and bottom wall 32 of the front-end loader. The various components of harness 220 are provided with holes 236 so that the harness may be adjusted to differently sized front-end loaders. Attached along the peripheral edges of side walls 76 of backhoe bucket 70 are connector arms 234 which extend upwardly from the bucket and are releasably attached to harness 222 by passing up through U-shaped bracket 228 and bolted or welded connector arms 224 near the free ends thereof. Arms 234 are provided with holes 238 to provide for adjustment purposes. Backhoe bucket 70 may be located anywhere along front-end loader 30.

Referring now to FIG. 5, a partial view of an alternative embodiment of a securing means 150 for securing backhoe bucket 70 to the front-end loader 30 comprises rigid tube 152 securely attached to one end to the upper portion of curved back wall 74. The other end of the tube 152 is securely attached to a shorter tube 154 extending perpendicularly therefrom in the same direction as bucket opening 80 faces. Securely attached to the other end of tube 154 is another tube 156 extending parallel to tube 152 and away from bucket 70. Tubes 152, 154 and 156 are fabricated of heavy gauge steel thick walled steel or iron to provided a strong attachment member. A pair of reinforcing brackets 158 are attached on either side of tubes 152, 154 and 156 by for example welding. The remainder of securing means 150 may be identical to securing means 72 shown in FIG. 2 wherein tube 156 in one embodiment replaces tube 100 and may be attached directly to the two brackets 110 and 112. In an alternative arrangement, tube 156 may be slidingly received within tube 100 in order to provide adjustment of the distance between bucket 70 and loader 30 as described previously and a hole 92 in tube 156 aligned with hole 102 in tube 100 in order to adjust the distance between backhoe bucket 70 and the loader.

Securing means 150 advantageously offsets or spaces backhoe bucket 70 forward of loader 30. This is advantageous with tractors in which loader 30 is mounted close to the front of chassis 12 so that there may be a danger of bucket 70 hitting the front of the tractor when pistons 62 are extended in operation to draw the backhoe bucket toward the operator.

Referring now to FIG. 6, a partial view of another alternative embodiment of a securing means 170 for securing backhoe bucket 70 to the front-end loader 30 comprises rigid tube 172 securely attached at one end to the upper portion of curved back wall 74. Tube 172 is slidingly received in tube 174 which in turn is securely attached to cross members 110 and 112. The distance between backhoe bucket 70 and bottom 32 of loader 30 is now adjusted by means of a pneumatic or hydraulic cylinder 176 pivotally attached at one end thereof to tube 172 at 178 and at the other end thereof to tube 174 at 180. Extending cylinder 176 increases the distance between backhoe bucket 70 and loader 30 and conversely retracting cylinder 176 decreases the distance between the bucket and the loader.

A partial view of another alternative embodiment of an attachment device for securing backhoe bucket 70 to loader 30 is shown in FIG. 7 generally at 190. Securing device 190 comprises a tube 192 securely attached at one end to the upper portion of curved back wall 74. Tube 192 is pivotally attached to a tube 194 by means of a pivotal connection at joint 196. Backhoe bucket 70 may be pivoted side-to-side with respect to tube 194 and hence loader 30 and the rest of the tractor by means of a hydraulic or pneumatic cylinder 198 pivotally connected at one end thereof to tube 194 at joint 200 and at the other end thereof to tube 192 at joint 202 located on a bracket 203 secured to tube 192 and extending laterally therefrom. Extending and retracting cylinder 198 causes bucket 70 to swing side-to-side as shown in ghost outline in FIG. 7. Attachment means 190 provides the advantage of permitting the operator to adjust backhoe bucket 70 with respect to the rest of the tractor when the latter is on sloped terrain so that the bucket digs with all the teeth 78 engaging the material being excavated. In one embodiment the upper part of the tube 194 above pivot joint 200 may be slidingly received within tube 100 (FIG. 2) and length adjustable wherein the upper portion of tube 194, not shown, is provided with a plurality of holes therein to receive pin 104 (FIG. 2). Alternatively, the upper portion of tube 194 which is broken away in FIG. 7 may be rigidly secured to bracket 110 similar to tube 100 shown in FIG. 2.

Figure 8:
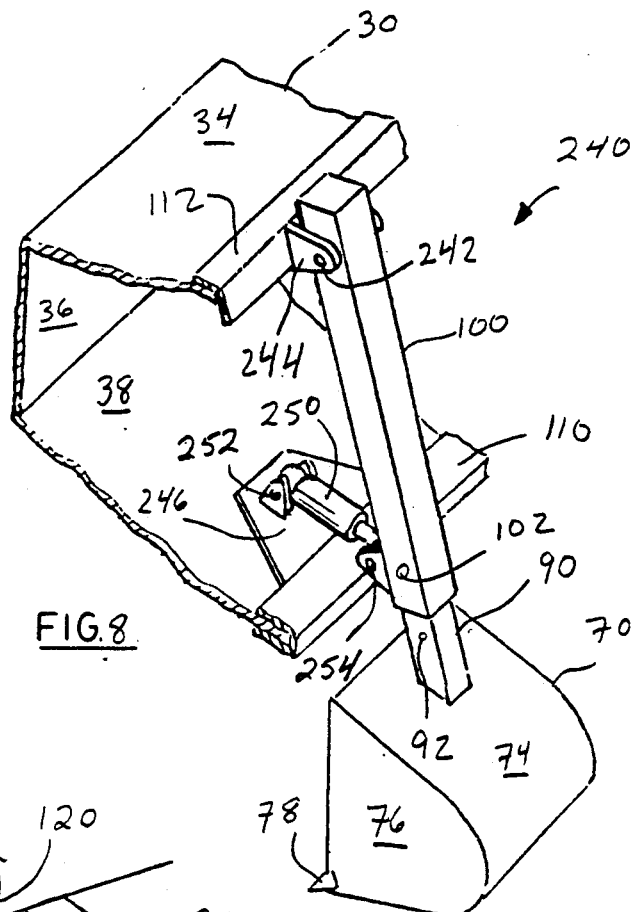
FIG. 8 is a perspective view, broken away, of an embodiment of a backhoe attachment for pivotally attaching a backhoe bucket to a front end loader of a tractor.

Referring to FIG. 8, an alternative attachment means for attaching a backhoe digger to a front-end loader shown at 240 comprises tube 100 being pivotally attached at 242 to a bracket 244 which is secured to bracket 112. A plate 246 is attached to bracket 110 to which one end of a cylinder 250 is pivotally attached at 252. The other end of cylinder 250, which is the extensible end, is pivotally attached to tube 110 at 254. Cylinder 250 is connected in such a way that it may be operated by the operator of the tractor so that backhoe 70 and tubes 90 and 100 may be pivoted with respect to front-end loader 30 and the rest of the tractor if desired.

Being able to rapidly releasably attach the backhoe bucket to the front-end loader provides the advantage of a tractor with a backhoe bucket but at a more economical cost since the system disclosed herein will in general be cheaper than a similar sized tractor having both a front-end loader and a backhoe bucket mounted to the front and back respectively of the tractor. In addition, attaching the backhoe bucket to the existing front-end loader rather than at the back of the tractor is advantageous in that the operator does not have to change his or her position during use. The backhoe bucket is used for digging operations in constricted areas and for digging trenches and working around tree trunks and the like, applications not readily performed by the front-end digger.

The backhoe bucket has been described herein as being attached specifically to a small utility farm tractor. However, those skilled in the art will readily foresee that similar attachments may be made to larger industrial tractors, buldozers, bobcats and the like comprising front-end loaders as described herein.

Therefore, while the small utility tractor modified with a backhoe digger attached to the front-end loader forming the present invention has been described and illustrated with respect to the preferred and alternate embodiments, it will be appreciated that numerous variations of these embodiments may be made without departing from the scope of the invention as described herein.

Therefore what is claimed is:

1. A backhoe apparatus for securement to a front-end loader of a tractor, the front-end loader of the type being pivotable about an axis extending transversely across the front of the tractor and capable of being raised and lowered with respect to the tractor, the front-end loader having a back wall and a forward-facing opening defined by at least a bottom wall with a peripheral bottom edge and a top wall with a peripheral top edge, the peripheral bottom edge and the peripheral top edge having a distance therebetween, the backhoe apparatus comprising: (i) a backhoe bucket with an opening for excavating and receiving materials; (ii) an elongate rigid support means having a length greater than the distance between the peripheral top edge and the peripheral bottom edge of the front-end loader, the support means having an end attached to the backhoe bucket; and (iii) means for releasably securing the support means to the front-end loader without modifying the front-end loader, with the support means bearing directly against the top and bottom peripheral edges of the front-end loader, and with the backhoe bucket opening facing rearwardly of the opening of the front-end loader and extending below the bottom wall of the front-end loader the securing means comprising a plurality of rigid rail members joined end to end and having two free ends, the rail members for extending about the top, back and bottom walls of the front-end loader, the first free end connectable to the support means near the top peripheral edge of the front-end loader and the second free end connectable to the support means near the bottom peripheral edge of the front-end loader, for securing the support means to the front-end loader.

2. A backhoe apparatus as claimed in claim 1 wherein the support means is retractably extendible to provide variable spacing of the backhoe bucket below the bottom wall of the front-end loader when secured to the front-end loader.

3. A backhoe apparatus as claimed in claim 2 wherein the support means comprises an elongate rigid member slidably extendible from within a rigid hollow tubular member to a plurality of positions at which the elongate rigid member may be fixed from further movement in relation to the rigid hollow tubular member.

4. A backhoe apparatus as claimed in claim 2 including an extensible/retractable means for extending and retracting the support means thereby variably spacing the backhoe bucket below the bottom wall of the front-end loader.

5. A backhoe apparatus as claimed in claim 4 wherein the extensible/retractable means is a hydraulic cylinder.

6. A backhoe apparatus as claimed in claim 1 wherein the support means includes at least two rigid arms pivotally attached together, at a point which lies between the backhoe bucket and the bottom of the front-end loader bucket when secured to the front-end loader, to permit pivotal movement of the backhoe bucket.

7. A backhoe apparatus as claimed in claim 6 including means for pivotal the rigid arms about the pivotal point of attachment.

8. A backhoe apparatus as claimed in claim 7 wherein the pivoting means is a hydraulic cylinder.

9. A backhoe apparatus as claimed in claim 1 wherein the securing means includes a top edge engaging bracket and a bottom edge engaging bracket, both attachable to the support means, for engaging the peripheral top and peripheral bottom edges of the front-end loader to secure the apparatus thereto.

10. A backhoe apparatus as claimed in claim 1 wherein the plurality of rigid rail members comprises a rail member for each wall of the front-end loader configured to extend across and conform to the wall when the apparatus is secured to the front-end loader.

11. A tractor having a front-end loader of the type being pivotable about an axis extending transversely across the front of the tractor and capable of being raised and lowered with respect to the tractor, the front-end loader having a back wall and a forward-facing opening defined by at least a bottom wall with a peripheral bottom edge and a top wall with a peripheral top edge, the peripheral bottom edge and the peripheral top edge having a distance therebetween, the tractor further comprising a backhoe apparatus secured to the front-end loader, the backhoe apparatus comprising: (i) a backhoe bucket with an opening for excavating and receiving materials; (ii) an elongate rigid support means having a length greater than the distance between the peripheral top edge and the peripheral bottom edge of the front-end loader, the support means having an end attached to the backhoe bucket; and (iii) means for releasably securing the support means to the front-end loader without modifying the front-end loader, with the support means bearing directly against the top and bottom peripheral edges of the front-end loader, and with the backhoe bucket opening facing rearwardly of the opening of the front-end loader and extending below the bottom wall of the front-end loader the securing means comprising a plurality of rigid rail members joined end to end and having two free ends, the rail members extending about the top, back and bottom walls of the front-end loader, the first free end connected to the support means near the top peripheral edge of the front-end loader and the second free end connected to the support means near the bottom peripheral edge of the front-end loader, to secure the support means to the front-end loader.

12. A tractor as claimed in claim 11 wherein the support means is retractably extendible to provide variable spacing of the backhoe bucket below the bottom wall of the front-end loader when secured to the front-end loader.

13. A tractor as claimed in claim 12 wherein the support means comprises an elongate rigid member slidably extendible from within a rigid hollow tubular member to a plurality of positions at which the elongate rigid member may be fixed from further movement in relation to the rigid hollow tubular member.

14. A tractor as claimed in claim 12 including an extensible/retractable means for extending and retracting the support means thereby variably spacing the backhoe bucket below the bottom wall of the front-end loader.

15. A tractor as claimed in claim 14 wherein the extensible/retractable means is a hydraulic cylinder.

16. A tractor as claimed in claim 11 wherein the support means includes at least two rigid arms pivotally attached together, at a point which lies between the backhoe bucket and the bottom of the front-end loader bucket when secured to the front-end loader, to permit pivotal movement of the backhoe bucket.

17. A tractor as claimed in claim 16 including means for pivoting the rigid arms about the pivotal point of attachment.

18. A tractor as claimed in claim 17 wherein the pivoting means is a hydraulic cylinder.

19. A tractor as claimed in claim 11 wherein the securing means includes a top edge engaging bracket and a bottom edge engaging bracket, both attachable to the support means, for engaging the peripheral top and peripheral bottom edges of the front-end loader to secure the apparatus thereto.

20. A tractor as claimed in claim 11 wherein the securing means comprises a second plurality of rigid rail members joined end to end and having two free ends, the second plurality of rail members extending about the top, back and bottom walls of the front-end loader, the first free end of the second plurality of rail members connected to the support means near the top peripheral edge of the front-end loader and the second free end of the second plurality of rail members connected to the support means near the bottom peripheral edge of the front-end loader, to secure the support means to the front-end loader.

21. A tractor as claimed in claim 11 wherein the plurality of rigid rail members comprises a rail member for each wall of the front-end loader configured to extend across and conform to the wall of the front-end loader.

22. A backhoe apparatus as claimed in claim 1 wherein the securing means comprises a second plurality of rigid rail members joined end to end and having two free ends, the second plurality of rail members for extending about the top, back and bottom walls of the front-end loader, the first free end of the second plurality of rail members connectable to the support means near the top peripheral edge of the front-end loader and the second free end of the second plurality of rail members connectable to the support means near the bottom peripheral edge of the front-end loader, for securing the support means to the front-end loader.

* * * * *

UNITED STATES PATENT AND TRADEMARK OFFICE
CERTIFICATE OF CORRECTION

PATENT NO. : 5,315,772
DATED : May 31, 1994
INVENTOR(S) : Nelson Lalonde

It is certified that error appears in the above-indentified patent and that said Letters Patent is hereby corrected as shown below:

Claim 7, column 8, line 46, cancel the first occurrence of "pivotal" and insert --pivoting--

Signed and Sealed this

Thirteenth Day of September, 1994

Attest:

BRUCE LEHMAN

Attesting Officer

*Commissioner of Patents and Trademarks*